O. RODHE.
GAS ANALYZING APPARATUS.
APPLICATION FILED JUNE 8, 1918.
1,385,150.
Patented July 19, 1921.
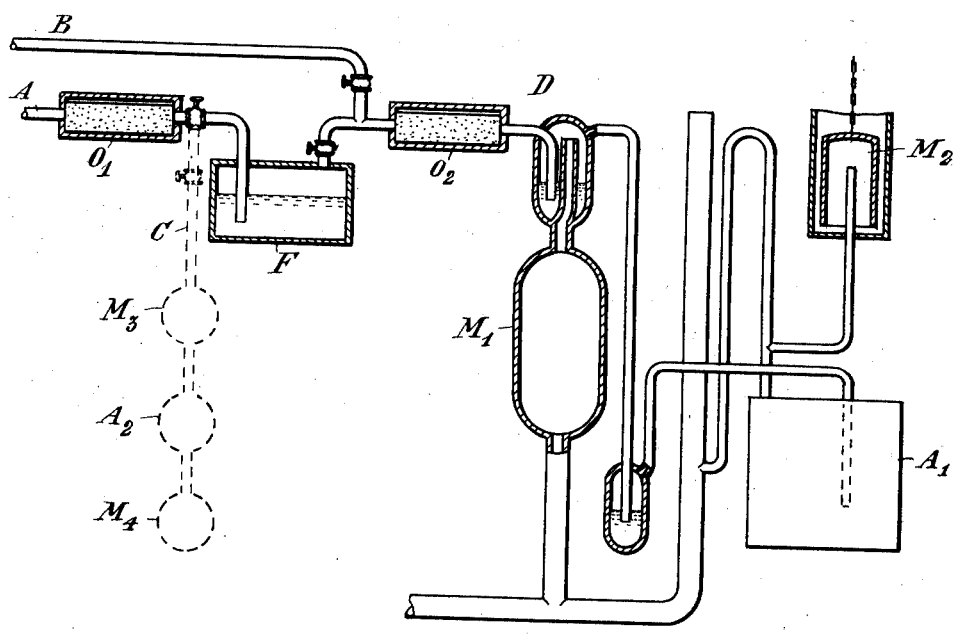

UNITED STATES PATENT OFFICE.

OLOF RODHE, OF STOCKHOLM, SWEDEN, ASSIGNOR TO SVENSKA AKTIEBOLAGET MONO.

GAS-ANALYZING APPARATUS.

1,385,150.  Specification of Letters Patent.  Patented July 19, 1921.

Application filed June 8, 1918. Serial No. 238,991.

*To all whom it may concern:*

Be it known that I, OLOF RODHE, subject of the King of Sweden, residing at 54 Odengatan, Stockholm, Sweden, have invented certain new and useful Improvements in Gas-Analyzing Apparatus, of which the following is a specification.

The present invention relates to improvements in gas-analyzing apparatuses, by means of which the percentage of carbon monoxid or hydrocarbon in a gaseous mixture is determined in such a manner, that the same is transformed to carbon dioxid, whereafter by means of a common gas-analyzing apparatus for carbon dioxid, the percentage carbon dioxid in the gaseous mixture is ascertained. The transformation of the carbon monoxid or the hydrocarbon is hereby effected by an oxidation in a furnace in the presence of an oxidizing-agent, for instance oxid of iron or oxid of copper, which is held at a suitable temperature. At the transformation a quantity of carbon dioxid is generated, the volume of which is equal to the volume of the carbon monoxid or the methane. It is thus possible to determine the percentage of carbon monoxid or hydrocarbon in an indirect way.

The object of the present invention is to provide a gas-analyzing apparatus of this known kind, which is arranged in such a manner that the percentage of hydrocarbon can be determined even when the gaseous mixture, which is to be analyzed, contains carbon monoxid. The apparatus is suitably further constructed in such a manner, that the percentage of carbon monoxid and hydrocarbon can be determined.

The invention consists therein, that the gas-analyzing apparatus is provided with two oxidation-furnaces, the contents of which are heated respectively to 250° and 700° C. These furnaces are further inserted in front of the gas-analyzing apparatus proper, provided with absorption- and measuring-vessels. In the first furnace carbon monoxid is oxidized to carbon dioxid, while the hydrocarbon, owing to the comparatively low temperature is constant. In the second furnace however, the hydrocarbon is transformed to carbon dioxid. During the passage between the two furnaces the carbon dioxid generated in the first furnace is eliminated either by means of a filter for carbon dioxid or by introducing the same into an absorption-vessel for carbon dioxid.

In the accompanying drawing the invention is schematically illustrated. The gaseous mixture, which is to be analyzed, containing carbon monoxid and hydrocarbon, is supplied through the piping A and flows at first to the furnace $O_1$, in which an oxidizing-agent, suitably a metal-oxid, for instance iron- or copper-oxid, is placed, heated to the comparatively low temperature about 250°, that is required for the oxidation of the carbon monoxid. In this furnace the carbon monoxid is transformed to carbon dioxid, while the hydrocarbon will not be changed at this low temperature. The gaseous mixture then flows to the absorption-vessel F, where the carbon dioxid is absorbed, for instance by flowing the whole quantity of gas through hydrate of potassium or other liquid, which absorbs the carbon dioxid. Thereafter the gaseous mixture, now containing neither carbon monoxid nor carbon dioxid, flows into the furnace $O_2$, which contains the same or another oxidizing-agent as $O_1$, heated, however to a higher temperature, for instance 700° C. Hereby the hydrocarbon is transformed to carbon dioxid. The volume of the carbon dioxid is equal to the volume of the methane $CH_4$. This volume is determined in a gas-analyzing apparatus of any usual kind, into which the gaseous mixture enters through the piping D. The apparatus consists for instance of a primary measuring-vessel $M_1$, an absorption-vessel A, for carbon dioxid and a secondary measuring-vessel $M_2$. The measured volume of carbon dioxid corresponds to the volume of the methane $CH_4$ in the original gaseous mixture as introduced through A.

If it is desired to determine only the percentage of carbon monoxid, a piping C can branch off between $O_1$ and $F_1$ as shown in dotted lines, which branch-piping leads to another gas-analyzing apparatus $M_3$, $A_2$, $M_4$ corresponding to $M_1$, $A_1$ and $M_2$.

If the total percentage of carbon monoxid and hydrocarbon is to be determined, the gaseous mixture may be introduced through a piping B, whereby in the furnace $O_2$ the carbon monoxid as well as hydrocarbon is transformed into carbon dioxid. The percentage of carbon dioxid will then be determined in the apparatus $M_1$, $A_1$, $M_2$; this percentage thereby will correspond to the total percentage of carbon monoxid and methane $CH_4$ in the gaseous mixture.

Claims.

1. Gas-analyzing apparatus, characterized thereby, that in front of the gas-analyzing apparatus proper, provided with absorption and measuring vessels, two furnaces for oxidation are arranged, an absorption receptacle with hydrate of potassium being arranged between the two furnaces.

2. In a gas-analyzing apparatus as claimed in claim 1, the arrangement of a second analyzing apparatus in a branch from the piping between the first furnace and an absorption receptacle for carbon-dioxid.

3. In a gas-analyzing apparatus as claimed in claim 1, the arrangement of a supply pipe for the gaseous mixture which is to be analyzed, said pipe communicating with the piping between an absorption receptacle for the carbon-dioxid and the second furnace.

4. In a gas-analyzing apparatus as claimed in claim 1, the arrangement of a pipe in parallel with the first furnace and the absorption receptacle for the carbon-dioxid.

In testimony whereof I affix my signature in presence of two witnesses.

OLOF RODHE.

Witnesses:
JACOB BAGGE,
MALBE KIERKEGAARD.